United States Patent [19]

O'Hare

[11] 4,451,436
[45] May 29, 1984

[54] NITROGEN FIXATION BY PLASMA AND CATALYST

[76] Inventor: Louis R. O'Hare, 1700 Banyan #3, Fort Collins, Colo. 80526

[21] Appl. No.: 442,367

[22] Filed: Feb. 1, 1983

[51] Int. Cl.³ .............................................. C01B 21/20
[52] U.S. Cl. ............................... 422/186.29; 204/177; 204/179; 422/186.24; 422/186.30; 422/904; 423/402; 423/405
[58] Field of Search ...................... 422/186.29, 186.24, 422/904, 186.30; 204/177, 179; 423/402, 405

[56] References Cited

U.S. PATENT DOCUMENTS

| | | | |
|---|---|---|---|
| 1,388,112 | 8/1921 | Hoofnagle | 423/402 |
| 1,547,714 | 7/1925 | Andriessens | 423/405 |
| 3,049,488 | 8/1962 | Jackson et al. | 422/186.29 |
| 3,421,988 | 1/1969 | Rochow | 204/164 |
| 3,983,021 | 9/1976 | Henis | 204/164 |
| 4,267,027 | 5/1981 | Amouroux et al. | 204/179 |

FOREIGN PATENT DOCUMENTS

| | | | |
|---|---|---|---|
| 48-32795 | 5/1973 | Japan | 423/402 |
| 130693 | 8/1919 | United Kingdom | 423/402 |
| 1216019 | 12/1970 | United Kingdom | 423/405 |

Primary Examiner—Deborah L. Kyle

[57] ABSTRACT

A system and a method of nitrogen fixation is disclosed in which nitrogen and other gases such as oxygen are electrically activated and reacted on a catalyst-like material to provide a fixed nitrogen product in such a way that the reactant gases are first placed into an excited state by a single electrode electric discharge acting on a gas stream and then by means of the stream the reactants are contacted on the catalyst-like material on which they are then combined and the product compounds which are thereby formed are shielded by the same catalytic material from ultra violet radiation generated by the electric excitation, said shielding being to prevent subsequent disassociation of the product compounds, and the gas stream emerging on the downstream side of the catalyst carries the products to an absorption bed on which they are absorbed and concentrated and then reacted with a periodic flow of hydrogen to provide ammonia. In an alternate embodiment the products absorbed on the bed are first desorbed and then reacted with hydrogen.

18 Claims, 10 Drawing Figures

NITROGEN FIXATION BY PLASMA AND CATALYST

This invention is a type of nitrogen fixation system which employs electric discharge through gases in order to make molecular nitrogen chemically reactive and to thereby have it combine with other elements. It relates to excited state chemistry because one or more of the reactants is raised to higher energy states. In the higher energy states the reactants are activated and more readily react with other chemical species. The invention also concerns the use of catalysts and catalyst-like materials on which different elements more readily react with one another. This invention particularily concerns the use of catalyst-like materials on which elements in excited states react efficiently to provide products with a minimum energy requirement. The invention then is a system which is a combination of electric discharge chemistry and catalyst chemistry and it resembles a variety of former art reactors which employ electric discharges through gases. These reactors use different types of discharges through gases. The types of discharges to be found in the former art are some of the following: the corona discharge, the inductive discharge such as the ring discharge, the condensed discharge, the brush discharge, the pulsed discharge, the radio frequency discharge, the electron beam, the electric arc and combinations of the above types such as the crossed discharge etc. In some cases the electric currents through the gases are used principally for their heating effects. This is the case for example with both high and low voltage electric arcs. In this case a chemical equilibrium between reactant and product gases is produced at high temperatures which favor a high percentage of products. The favorable proportions of the high temperature equilibrium are quickly frozen by a very rapid cooling of the gas and a significant quantity of product gas is obtained. An example of this art is the use of the pulsed discharge in which a very short burst of intense electric current provides for the rapid heating and cooling of the reactants. An example of this art is the Bradley and Lovejoy process used at Niagara Falls. A multitude of small arcs were rapidly started and stopped to produce nitric oxide and to rapidly cool it with surrounding air. More recently this art has been developed by V. S. Komel'Kov and V. I. Modzolevskii and is described in the Russian Journal of Physical Chemistry 52 (6) 1978. Other developments were made by V. V. Koval, V. A. Petrishchev and P. S. Khmelevoi. Their system is published in Khimiya Vysokikh Energin, Vol. 14, No. 1 P.P. 61-65 Jan. and Feb. 1980. The Pauling process at Nitrolee, S.C. in 1913 relied on high temperatures and rapid cooling as did the Wielgolaski furnace process which used cooling pipes for that purpose. Similar examples are the Birkeland-Eyde and the Schonherr-Hessberger processes. The difficulty with all of these processes is the large amount of energy required for a relatively small amount of product. Other systems used current flow in gases for effects other than heating effects. These systems used various types of electric discharges in order to excite gas molecules into higher energy states and to electrically activate chemicals to that they will more readily react. One such system in the former art is the crossed discharge activation system designed by William J. Cotton to provide nitric oxide efficiently. The crossed discharge utilizes both radio frequency and low frequency discharges at right angles to each other, yet the temperature of the discharge is so low that it does not ignite mixtures of combustible gases. In another example of this art excited state nitrogen combines with excited state hydrogen to provide ammonia as a product. This reaction is accomplished at low temperatures and very low pressures of a few Torr by means of the glow discharge. However, it consumes considerable energy in reducing the pressures to enable the discharge to take place in a low heat situation. Additional energy is required to circulate significant quantities of gas at such low pressures. An example of this system is described in the book, "Electrochemical Engineering" by C. L. Mantell published by McGraw Hill 1960 on page 540. Ammonia is produced from excited hydrogen and excited nitrogen in the negative glow area and in the positive column of a glow discharge.

The most significant former art in so far as it relates to this present invention is contained in the inventions of E. G. Rochow, U.S. Pat. No. 3,421,988 and in that of D. Rapakoulias, S. Cavadias and J. Amouroux as described in "Revue de Physique Appliquée" 15 (1980) P.P. 1261-1265. In both of these inventions electrically excited gas phase species are contacted onto a catalyst and reacted to provide a product. The product produced in both cases is the result of both electric excitation and catalysis reaction. In the Rochow invention an ionizing wire in an ozone type generator provides excited state gas reactants which contact a catalyst on a surrounding cylindrical wall. However, heretofore, the Rochow invention has not been applied to the fixation of nitrogen nor does it specify any appropriate catalyst for reacting activated nitrogen with any other activated or non activated element. Another significant difficulty with the Rochow invention is that the ultra violet radiation, generated in the process of gas excitation, destroys a percentage of the product being produced thereby reducing energy efficiency. Any conventional application of shielding results in contacting the excited gas with the shield and thereby removing the required excitation from the gas molecules and atoms.

In the invention of Rapakoulias et al an inductive discharge of the ring type electrically excites nitrogen and oxygen in a tube at a low temperature and at a pressure of only 40 millibars and the excited species then react on a catalyst deposited on the inner wall of the tube to thereby produce nitric oxide. The catalyst is cooled principally by cooling the tube. As is the case with the Rochow invention, the difficulty with this system is the tendency of the ultra violet light present in the electric discharge to destroy much of the product. Nitric oxide is destroyed as it is being formed. Another difficulty is that this system requires a large amount of energy to produce the high vacuum required for the inductive discharge to be effective. Circulating the reactant gases to remove product and to recycle unreacted gas also requires significant energy under these vacuum conditions. An object of the present invention is then to provide a system requiring less of a vacuum and one with a discharge system that is more effective and operates well at higher pressures in order to reduce both the volume of pumping required for a given quantity of product as well as to reduce electric energy requirement.

The principal objective of my present invention is simply to provide a more energy efficient means of fixing nitrogen with a minimum of construction expense. The system is to provide a small plant nitrogen fixation capability which can be constructed and operated at the village level. Another object is to provide an electric discharge system which operates advantageously in conjunction with a catalyst for combining nitrogen with other elements. Another object is the removal of inhibiting factors which curtail the production of fixed nitrogen products in electric discharge reactors. In accord with this objective the invention is to provide a means of rapidly shielding product gases from ultraviolet radiation in such a way as to prevent simultaneous loss of excitation in the excited state reactant gases. To state this objective more specifically, it is to use the catalyst material itself in such a way that it becomes a means of shielding reactants and products from the damaging effects of ultraviolet radiation. The use of conventional shielding means would cause the loss of excitation in those excited molecules which must be in the excited state to react on the catalyst. It is important to provide shielding without excitation loss. This is to be accomplished by using the catalyst itself as a shield from ultraviolet light. In this way any contact of the shield with the excited gas species will be productive rather than merely cause a loss of excitation. Also, since the catalyst receives high energy reactants, a special means of cooling must be an objective for a catalyst having an unique function. Another object is to provide an absorbtion bed which can both concentrate dilute proportions of product from a gas stream and at the same time be a means of reacting the absorbed species into another product which is more convenient to use. Nitric oxide for example is to be absorbed from a stream of nitrogen and oxygen and then reacted with hydrogen on a single bed in order to provide ammonia, because ammonia is a very convenient fertilizer.

The degree to which the difficulties found in the former art are remedied in this present invention and the ways in which the objectives are achieved will be clarified by referring now to the drawings.

FIG. 1a of the drawings shows a vertical transparent cylinder enclosed by a screen on top and containing a single electrode plasma generator in the form of a radio frequency coil surmounted by a vertical electrode.

Figure 1A:
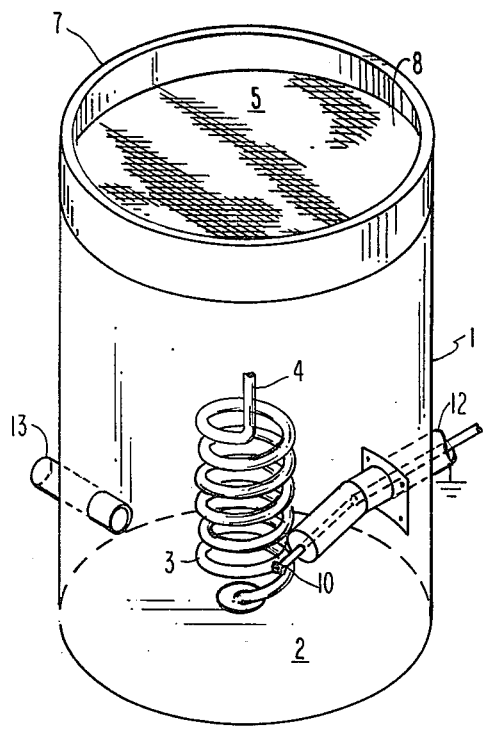
FIG. 1b shows a cylindrical cover for sealing the top of the plasma generator with its catalytic screen.
FIG. 1c shows a separated part of the plasma generator consisting of its screen mounted on the bottom of a short section of cylinder.
Figure 1B:
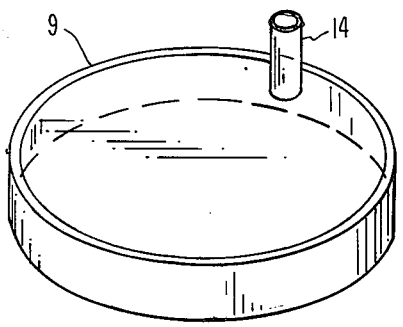

Referring then to FIG. 1a, the transparent cylindrical chamber 1 is sealed at its base by a transparent base plate 2. This cylinder 2 is typically of glass or plastic or other material capable of withstanding external pressure of approximately one atmosphere since a partial vacuum is to be produced within. The radio frequency coil 3 is a coil having a high Q factor and a very high impedance at the frequency at which it operates. The frequency range of 3 in various embodiments is from 30 megahertz to 250 megahertz. This coil 3 is coupled by appropriate impedance matching means such as coil tap 10 and by feed line 12 to a radio frequency power generator not shown. The power generator is capable of providing sufficient energy to produce an ionizing glow at the upper tip of electrode 4. The radio frequency energy required to produce this glow will vary in different embodiments according to the degree of vacuum produced in chamber 1. In one embodiment for example a power of 300 watts produces a glow throughout the entire upper volume of chamber 1 when air is present there at the reduced pressure of 0.17 atmospheres. In this embodiment the impedance of the entire coil 3 is approximately 30,000 ohms. In accordance with the invention gases in 1 are activated and placed into excited states by the discharge from electrode 4 under the influence of the high voltage radio frequency current on this electrode. The excited state gases are drawn through the catalytic screen 5 on which they react to form chemical products, such as nitric oxide when nitrogen and oxygen are used as reactants. In one embodiment the screen 5 is very fine mesh of tungsten which has been anodized to provide a tungstic oxide surface. In other embodiments other metals are coated with oxides by anodizing and other means. Some of these metals for instance are molybdenum, chromium, manganese and alloys such as nichrome. In still other embodiments metalic wire screens are used in their elemental form such as iron and tantalum as well as the above metals and alloys. The cylindrical extension ring 7 provides a cylindrical wall for a plenum chamber 8 which is formed when cover 9, shown in FIG. 1b, is placed over chambers 1 and 8 in order to seal them. The gases which are drawn from 1 up through plenum chamber 8 enter through inlet duct 13 and product gases leave through exit duct 14 of the cover 9 shown in FIG. 1b. The gases are cycled through external absorbers, reactors and a pump described in subsequent drawings. In this FIG. 1a the coil tap 10 is used in one embodiment as a means of matching the total impedance of coil 3 to the impedance of the radio frequency transmission line 11. In this embodiment the center wire of a 50 ohm coaxial cable 19 is connected to the tap 10 and the shield on the coaxial cable 19 is connected to the bottom end of coil 3 and to ground. The location of the tap 10 may be changed from its initial position of one turn up from the bottom end of the coil to a higher position on the coil in order to increase the impedance of the match and achieve a more favorable power transfer from the line to the plasma generator coil 3. Other impedance matching systems as well as radio frequency power generators are shown in subsequent drawings and are well understood in the radio frequency power art. One example of an alternate matching system to be used in one embodiment is the employment of transformer coupling in which a separate turn of wire, not shown, is made to encircle coil 3 and the center conductor of the coaxial feed line is connected to one end of this additional coil and the other end of this coil turn is connected to the coaxial feed line shield by means of a variable capacitor in series with this end and the shield. The capacitor, not shown, is variable in the range of approximately 5 to 75 picofarads. Similarly, a state of resonance in coil 3 for the most efficient activation of gases may be obtained by changing the number of its turns or by placing a variable capacitor across a few of the coil's lower turns and then changing the capacitor for a condition of resonance. A characteristic of the impedance of the coil used for single electrode discharge is that the inductive reactance is very high and that the resonant condition is achieved in the coil with very little capacitance across the coil windings. Consequently any capacitance that might be necessary to bring the coil 3 to a resonant condition must be limited to the use of capacitance connected across a few turns at the grounded end of the coil. The uppermost windings of 3 are kept free of any externally connected capacitors in order that a very high voltage might develop on the electrode 4. In the case of an embodiment with the moderate power of 300 watts, 3000 to 5000 volts develop at the high voltage end of the coil to which the electrode is attached. The value of this type of very high frequency with very high voltage can be seen from the fact that it will produce a diffused discharge in air even at atmospheric pressure. Such a discharge can be demonstrated by contacting electrode 4 with the metallic tip of a screwdriver having an insulated handle. When the tip of the screwdriver is slowly drawn away from the electrode while the power is being applied, an electric arc will first form between the electrode and the screwdriver and as then as the screwdriver is farther removed from the vicinity of the electrode the arc will leave the tip of the screwdriver and a flame-like discharge will be emitted from the electrode. This flame-like glow persists with the screwdriver entirely removed from the area. By reducing the gas pressure in 1 around the flame-like glow, the glowing area becomes much larger. At 1/6 atmosphere a very large area of activation can be produced with only 300 watts of power. This discharge provides a high yield of activated gas particles at relatively high pressures with a low energy requirement. There is no requirement for deep vacuum pumping. The discharge does not require even the use of the screwdriver for starting when pressure is reduced slightly below atmospheric pressure. A large gas quantity is activated in this way without pumping a very large volume of gas. In the former art it was necessary to pump a large volume of gas for activating a given quantity because it was necessary to pump gas at very reduced pressure. Not only for reasons of the volume required did the former art require more energy but additional energy was required to operate pumps at lower pressures. The former pressure ranges were in the range of a few torr to 30 torr, whereas now activation is efficiently accomplished at 127 torr and even much higher, even under low power inputs. This means that the pumping volume can now be reduced by a factor of more than 4. This energy saving should also be seen in the light of the higher yields per quantity of gas used which are available as a function of the application of a catalyst.

Referring then to FIG. 1b, the transparent cover 9 fits over the top of plasma chamber 1 and plenum 8 and vacuum seal such as silicone grease seals the outer walls of 1 and 7 to the inner wall of 9. The exit duct 14 removes product gases. The chamber 1 and plenum 8 are shown in FIG. 1a.

Figure 1C:
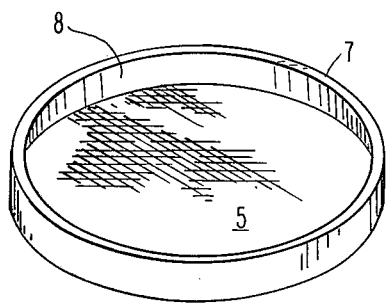

Referring then to FIG. 1c, the screen 5 is the same as 5 in FIG. 1a and is illustrated separately in this FIG. 1c to further clarify its relation to ring 7 and to cover 9 of FIG. 1b. The ring 7 then separates the top of cylinder 1 from the top of the cover 9 and a cavity is formed inside of 7 bounded on the top by the top of 9 and on the bottom by screen 5. The cavity so formed is plenum chamber 8. The screen 5 provides a means of contacting excited gases with catalytic material as well as with a means of shielding excited and reacted gases from the damaging effects of ultraviolet radiation from the plasma chamber 1 of FIG. 1a. For this reason it is not intended to limit either the thickness nor the number of screen layers of screen 5 because the essential characteristic of 5 is that it be an adequate shield as well as a catalyst. In one embodiment screen 5 is assisted in its essential function by other catalyst material which it supports. In this embodiment 5 holds pellets or powders of appropriate catalysts. The placement of the catalytic screen as well as other catalyst material above the single electrode discharge enables the discharge to be more readily sustained and it makes an advantageous use of convection currents from the discharge in that the currents rise by heating from the discharge and assist in contacting the catalyst with the activated gas. Besides the catalysts mentioned previously the system has broad application to a wide variety of excited state catalytic reactions. For instance it is known that active nitrogen is chemisorbed on a wide variety of materials on which it is not absorbed in its molecular form. Also rotationally and vibrationally excited molecular nitrogen are absorbed on compounds on which unexcited molecular nitrogen is not absorbed. Examples of compounds on which nitrogen absorbtion is made possible by electrically exciting the nitrogen are aluminum oxide (activated), ferric oxide, titanium dioxide, silicon dioxide, sodium y type zeolites, nickel y type and cobalt y type zeolites, manganese x and y type zeolites. Elements on which atomic nitrogen is absorbed chemically are tungsten, tantalum, atomic aluminum (as in graphimets) and molybdenum. Since hydrogen is absorbed on the above compounds and elements, and they are hydrogenation catalysts, nitrogen and hydrogen are reacted to provide ammonia on screens made from the above metals as well as using catalysts of the above compounds supported on catalytic screens. For instance a ferric oxide catalytic screen is provided for screen 5 by oxidizing a fine mesh iron wire screen. The oxidizing can be done by anodizing or by oxidizing agents. An aluminum oxide screen and a titanium oxide screen are provided for screen 5 in the same manner. Pellets of the above zeolites are supported on tungsten wire screens to provide a combination of catalysts in another embodiment. Other combinations of the above compounds and elements are used in other embodiments. When the elements described in this FIG. 1c are in their proper place, shown at the top of 1 in FIG. 1a, and the cover 9 is in place sealing chambers 1 and 8, then a radio frequency shield in the form of a metal screen or perforated metal foil not shown is placed around the entire assemblage. This shield has openings, not shown, in order to admit the radio frequency feed line 11 and inlet and exit ports 13 and 14. This shield is grounded to prevent radiation energy loss from coil 3 of FIG. 1a. Without the shield, 3 and 4 of FIG. 1a act as an antenna and energy which is intended for plasma generation would be radiated as an electromagnetic wave. A screen or perforated foil is employed as a shield, rather than a solid metal foil, to facilitate observation of the plasma and enhance the resonating of coil 3 which is adjusted to produce the greatest plasma activity and glow for a given amount of power consumed.

Figure 2A:
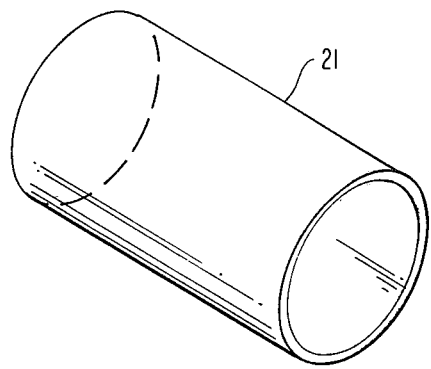
FIG. 2a shows one element of a catalytic bed plasma generator in the form of a metallic cylinder which is used to enclose and shield a radio frequency coil.

Referring then to FIG. 2a, the metallic cylinder 21 is a radio frequency shield used to prevent energy loss by curtailing radio frequency radiation.

Figure 2B:
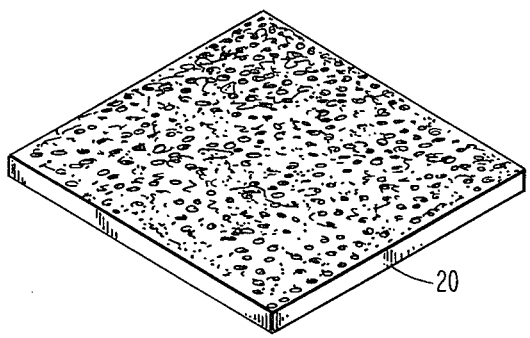
FIG. 2b shows a fritted glass plate which is used to support catalyst material.

In FIG. 2b the fritted glass plate 20 is a catalyst support plate which permits a gas flow through its pores without allowing powders or pellets of catalyst material to pass the pores. Porous ceramics, plastics and metals as well as screens with very fine mesh are to be used as alternate catalyst supports in place of fritted glass for this purpose. The catalytic material is not shown in its position on top of plate 20 in order to show the plate clearly, but it is to be understood that 20 will always be entirely covered with catalysts in accord with the invention. A stream of electrically activated gas will be moving through a catalyst such as $Cr_2O_3$ on alumina not shown and then through porous plate 20 which supports it.

Figure 2C:
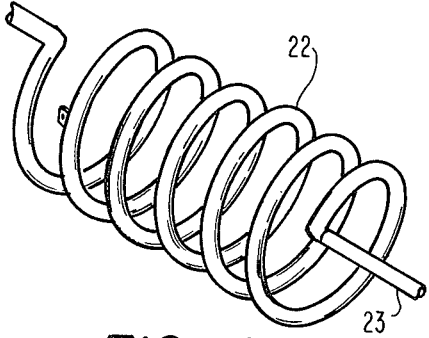
FIG. 2c shows a coil having high impedance at very high frequencies.

Now in FIG. 2c, the radio frequency coil 22 is like coil 3 of FIG. 1a. In one embodiment in which the plasma generator is operated at a power of 300 watts and a frequency of fifty megahertz, the coil 22 has six turns of one fourth inch diameter of copper tubing. The inside diameter of the coil is three quarters of an inch and a fifty ohm impedance matching tap is one turn from the grounded end. The coil 22 is tuned to resonance by changing the spacing between the turns or changing the number of turns etc. as indicated for coil 3 in FIG. 1a. The electrode 23 is connected to the high voltage end of 22. This is opposite the end which is grounded. Electrode 23 is the same as 4 of FIG. 1a with the exception that 23 is mounted in a horizontal position in this embodiment. In other embodiments the electrode is mounted in an inverted position with the tip of the electrode being its lowest point. In this case the grounded end of the coil would be upper most and the high voltage end is located below the grounded end. This inverted condition is not shown but it is described in order to indicate the intention of not limiting the inventive concept to any particular placement of coil and electrode. The electrode 23 is of metal which can withstand moderate temperatures and transfer heat away from the tip as for example copper or tungsten. Cesium and copper alloys as well as alloys of metals with low work function may be used for electrode 23 as a way of reducing the energy required for ionization in the plasma. The electric field intensity at the tip of 23 may be increased by terminating the tip in a sharp point. This reduces the starting voltage required of the coil 22 for initiating the discharge in another embodiment. Coil 22 is separated a significant distance from its radio frequency shield 21 which encloses it. This separation is for the purpose of reducing to a minimum the capacitance between 22 and 21. For instance a separation of two inches between the outside of 22 and the inside of 21 provides an L/C ratio with enough inductance to produce sufficient voltage on 23 to sustain a plasma at 300 watts of power. Coil tap 24 is the same as 10 of FIG. 1a.

Figure 2D:
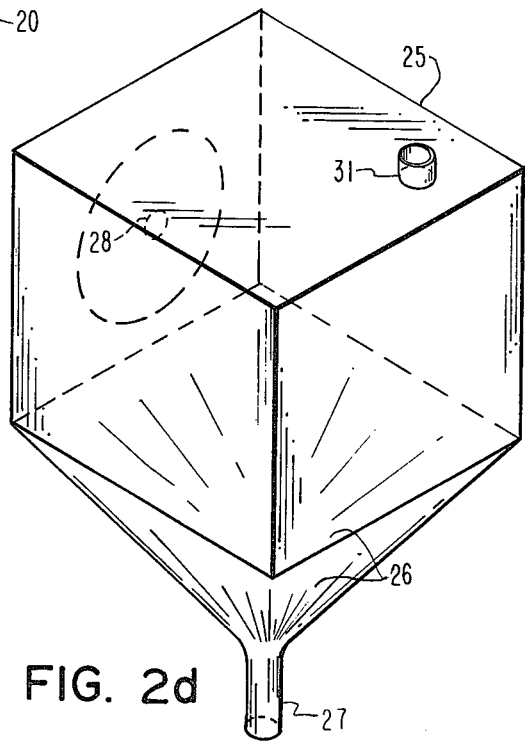
FIG. 2d shows a square plasma chamber used to support the coil and to contain the fritted glass plate.

Referring to FIG. 2d, the transparent plastic box 25 has an inlet port 31 for receiving reactant gases. The bottom side of 25 opens into a funnel shaped plenum chamber 26 with exit port 27 at its base. The electrode entry hole 28 is for receiving electrode 23 into 25. Electrode 23 is to be supported by the sides of hole 28 and sealed to it.

Figure 3:
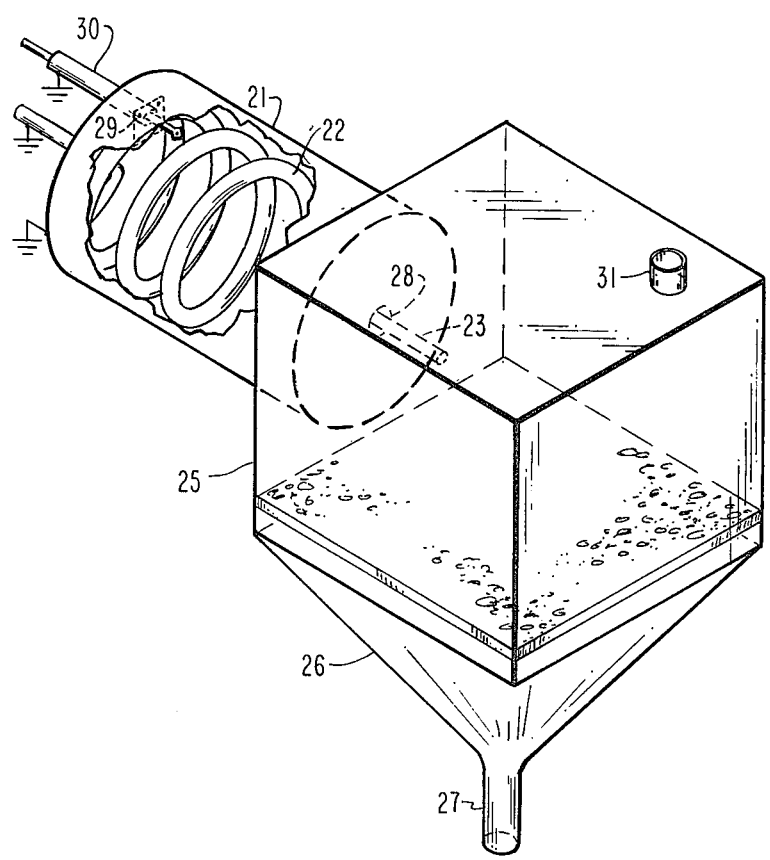
FIG. 3 shows an assembled plasma chamber containing a porous glass plate at its base and having a cut away section on its coil shield to give a view of a coil within.

Referring then to FIG. 3, the transparent box 25 is the same as box 25 of FIG. 2d and it forms the plasma reaction chamber. It is not intended to restrict the material of this box to plastic alone but glass and other materials are equally suitable. Ports 31 and 27 are the same as those of FIG. 2d as is electrode entry hole 28 which is the same as 28 of FIG. 2d. Also the plenum 26 in this FIG. 3 is the same as plenum 26 of FIG. 2d. The fritted glass plate 20 is the same in both FIG. 2d and FIG. 3. In FIG. 3 plate 20 is shown in its assembled position, sealed into the bottom of reaction chamber 25 in which it is the floor of 25. This porous plate 20 holds catalytic material which is not shown in order to better illustrate the position of 20. Reactant gases, such as nitrogen and oxygen, enter 25 through port 31 and are excited by electrode 23. The gases then pass through the catalytic material on 20 such as $Cr_2O_3$ and are reacted on it and at the same time shielded by the same catalyst material from prolonged contact with the ultraviolet light emitted by the discharge of 23. Product gases, such as nitric oxide etc., which are produced both in the space around 23 as well as on the catalyst material itself are prevented from photodisassociating by the shielding action of the catalyst as a gas stream carries the gases quickly from the illuminated area into the catalyst bed and then through the pores of 20 into plenum 26 and out port 27. The electrode 23 and coil 22 with tap 25 are the same respectively as 23,22 and 25 of FIG. 2c. In this FIG. 3 coaxial power line 30 and connector 29 couple radio frequency power from an r.f. generator not shown to coil 22. A metallic screen or perforated metallic foil, which is not shown but which has approximately the same shape as box 25 but is slightly larger in order to fit over 25, is placed entirely around chamber 25. This metallic screen has small openings not shown to accommodate ports 31 and 27 and shield 21. This same metallic shield as well as shield 21 are connected to ground. Also connected to ground is the end of coil 22 opposite the end attached to electrode 23. The purpose of the screen around chamber 25 is to prevent radio frequency radiation from 23 which would otherwise react as a radio transmitting antenna.

Figure 4:
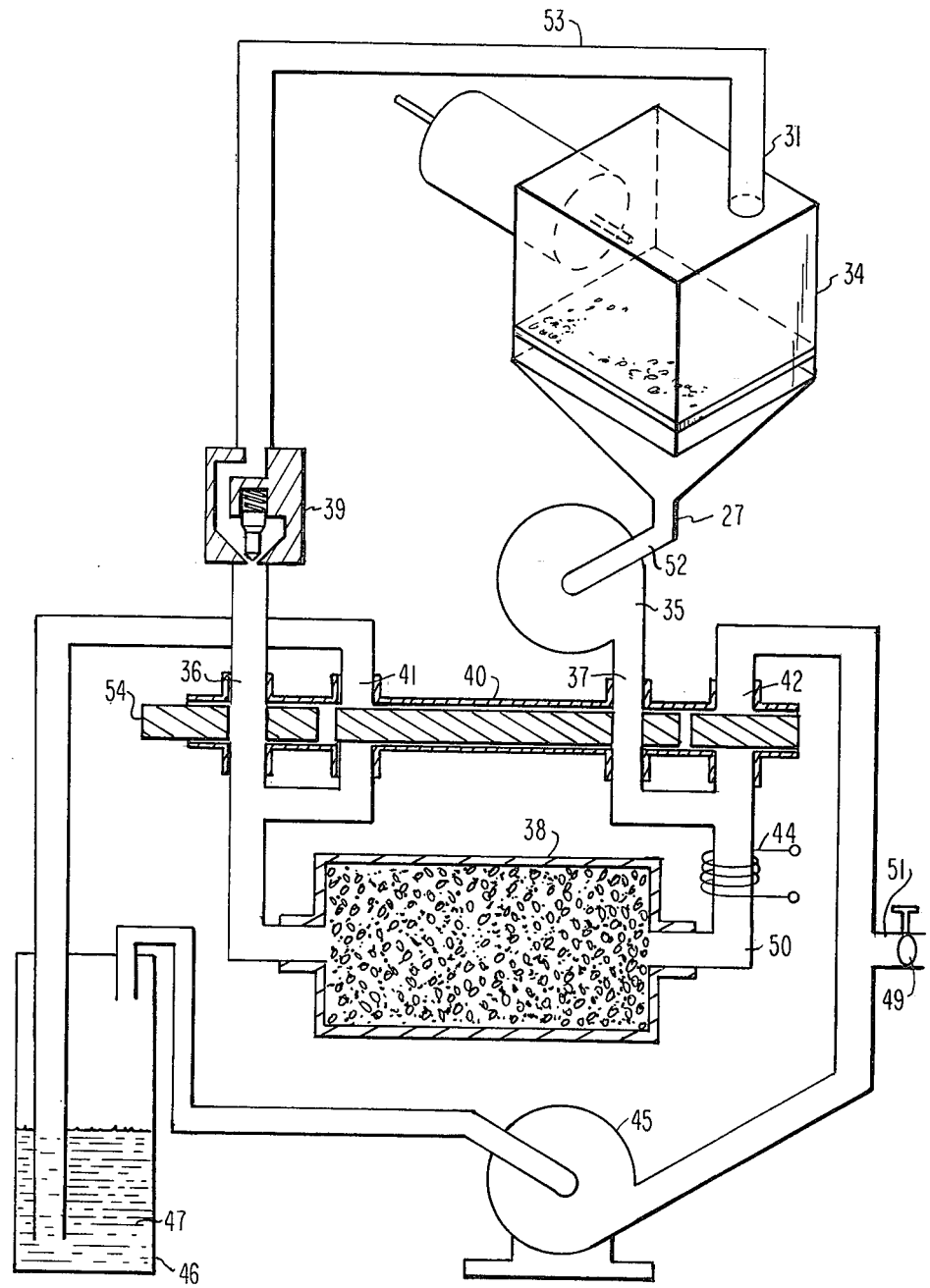
FIG. 4 shows a small scale plasma chamber with ducting, valving, absorbtion chambers, pumps and gas inlet control valves.

Referring now to FIG. 4, the plasma reactor 34 is the same as the reactor described in FIG. 3. The function of the individual elements is not repeated here as it is detailed in FIG. 3. In this FIG. 4 the vacuum pump 35 both reduces gas pressure in 34 and cycles gas through valve openings 36 and 37 as well as though absorber bed 38 and through vacuum relief valve 39 during a first time period. The degree to which pressure is reduced in 34 is determined by the setting of 39. The gas flow rate through 34 is determined by the pumping rate of pump 35. During this first time period gases reacted in 34 are absorbed by absorbtion-reaction chamber 38 which contains multiple function compounds, one function of which is to chemisorb the product gases of 34 in this period. In one embodiment the reaction products of the reaction, which takes place during this first time period in 34 and are absorbed in that period, subsequently become reactants in 38 during a second time period. The reaction which takes place in 38 during this second period involves both a desorbtion of the gases previously absorbed as well as a catalytic reaction of those gases with another gas. There are two different valving conditions with respect to valve 40. Each condition corresponds to a time period and to a set of chemical reactions taking place during its period. Just as during the first period valve openings 36 and 37 are open while activation is occuring in 34 and absorbtion is taking place in 38, so in the second period 36 and 37 are closed while valve openings 41 and 42 are open and desorbtion is occuring in 38. The desorbtion which takes place in this period is achieved by a variety of different mechanisms according to different embodiments. In one embodiment the desorbtion is the result of directly reacting the absorbed material with another gas. This is the case for example in the embodiment in which nitric oxide is the absorbed material, which was generated and absorbed in the first period, and hydrogen is the gas admitted during the second period. In the second period the hydrogen reacts directly with the absorbed nitric oxide to desorb it and to produce ammonia which is removed from the circulating gas cycle by water 47 in product collection chamber 46. In another embodiment the desorbtion taking place during the second time period is accomplished by a stream of heated gas circulated through 38. An example of this type of desorbtion is the circulation of air heated by electric heater windings 44 and moved by gas pump 45 through 38. In this example the nitric oxide previously absorbed in the first period is removed from the absorbent by heat in the second period and carried by hot air to product chamber 46 in which it reacts with water 47 and air to provide nitric acid. Reactant gas inlet valve 48 periodically admits the reactant gases for the reactions of the first period. Second reactant gas inlet valve 49 periodically admits gas to react in 38. In the principal embodiment of the invention, nitric oxide is absorbed in 38 in order to concentrate nitric oxide from an oxygen-enriched air stream flowing through 34 in the first period. This absorbtion is carried out by a number of absorbents used by current art. The absorbents are used separately or in conjunction with catalysts or mixtures of absorbents with other absorbents. Numerous different absorbents can be used. Some of the absorbents to be so used are copper-chromium impregnated on carbon supports according to U.S. Pat. No. 3,576,596, and chromium trioxide on activated alumina or on silica gel according to U.S. Pat. No. 3,050,363 as well as zeolite molecular seives according to U.S. Pat. Nos. 3,674,429 and 3,389,961. Other absorbents to be used in absorbtion chamber 38 are cupric oxide on alumina, manganese oxide, platinum supported on silica, platinum supported on alumina, rhenium and rhodium supported in the same manner, nickel oxide as well as nickel oxide with copper oxide supported on alumina, magnesium oxide and molybdenum trioxide and CoNiNaY type crystaline zeolite.

After the first products are absorbed and thereby concentrated from the gas stream passing through 38 by the use of any of the above absorbents or by the combination of any of these absorbents, then in a second period hydrogen is admitted through valve 49 and duct 51. The hydrogen is cycled through valve openings 41 and 42. The hydrogen is heated by electric coil heater 44 and it reacts with the absorbed nitric oxide in 38 and produces ammonia. The hydrogen admitted through 49 is moved by pump 45 from 38 to product chamber 46 in which it reacts with water 47 to provide aqueous ammonia. Unreacted hydrogen is cycled back to 38 and additional hydrogen is admitted through 49 until the nitric oxide in 38 is virtually all reacted, then the condition of valve 40 changes. Openings 41 and 42 are closed while 36 and 37 are again open to begin again the first period of another cycle.

It is not intended that the diagram given in this FIG. 4 be used to limit the invention to a reactor of one particular shape such as that described in FIG. 3 and shown in FIG. 4 as reactor 34. On the contrary the reactor design of FIG. 1 replaces 34 in one embodiment since 34 is a modification of the reactor shown in FIG. 1. The conversion of the system shown in FIG. 4 is not shown, but the conversion of the system to use the reactor of FIG. 1 is simple. In it exit port 27 of reactor 34 is disconnected from duct 52 and exit port 14 of the reactor of FIG. 1 is connected to duct 52 going to the inlet of pump 35. Similarly, inlet port 31 is disconnected from duct 53 and inlet port 13 is connected in its place. Also it is not intended to limit the inventive concept to a particular form of heater for the reaction in 38. In other embodiments the resistance heater 44 heating duct 50 and the gas within in order to heat the absorbent within 38 is replaced by a catalytic heater or a flame combustion heater not shown which heat 50. An electric resistance heater within 38 can also be used to heat 38 in another embodiment, but it is not shown in the drawing. The electric current source to heat 44 is not shown as the association between electric current and electric heaters is well understood in current art. The actuation of valve 40 is accomplished be slider rod 54 which is moved to the right to open 41 and 42 and to the left for the position shown in which 36 and 37 are open. The movement of 54 may be accomplished manually or it may be operated electrically and automatically by the use of probes which sense the saturation of the absorbents in 38 and complete a circuit to a solenoid which moves 54 to the right when 38 is saturated and then open a circuit to move 54 to the left when the absorbed material is removed from 38. In another embodiment a timing mechanism is used to periodically move 54 first to the right and then to the left. The automatic mechanisms are not shown as the periodic operation of valves is understood in current art.

Figure 5:
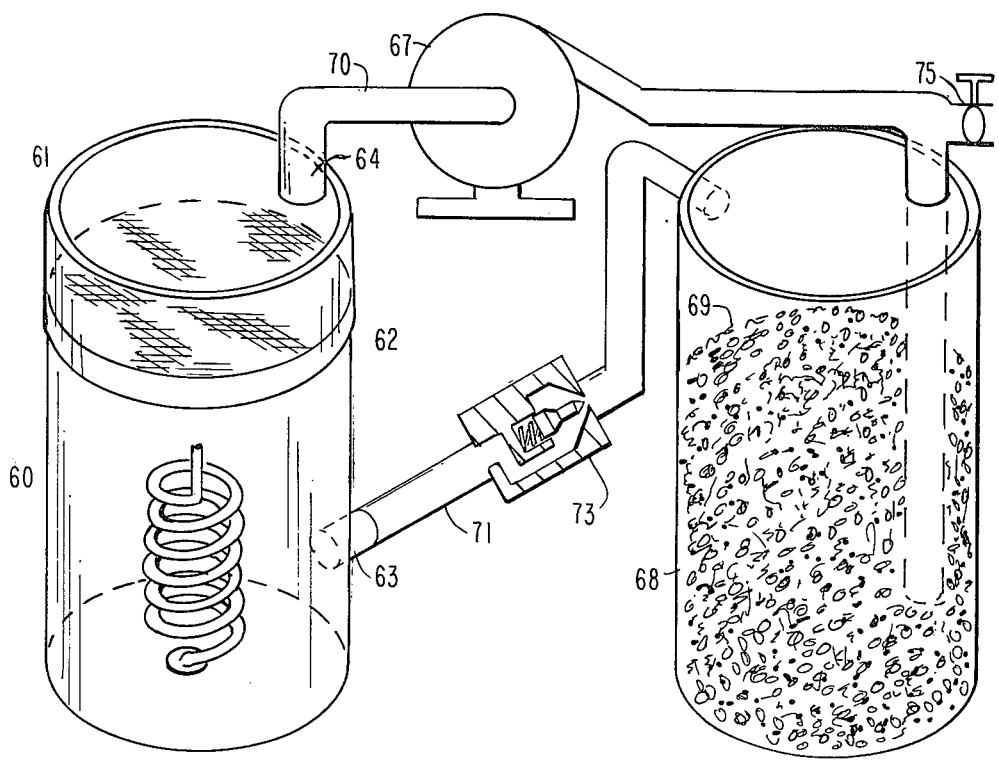
FIG. 5 shows a simplified plasma reactor with a simple product removal means.

Referring to FIG. 5, the plasma reactor 60 is the same as that described in FIG. 1. In this FIG. 5 the cover 9 of FIG. 1 is shown in its assembled position. The cover 61 is the same as 9 of FIG. 1 and screen 62 is the same as screen 5 of FIG. 1. Accordingly, 62 is single or multiple layer screening in different embodiments and is used in some embodiments to support catalytic material as described in FIG. 1. The inlet port 63 in this FIG. 5 is the same as 13 of FIG. 1 and the outlet port 14 of FIG. 1 is the same as port 64 of this FIG. 5. Coil 65 and electrode 66 are the same respectively as coil 3 and electrode 4 of FIG. 1. Other elements of the reactor of FIG. 1 are not shown in 60 of FIG. 5 since they were previously described and are omitted to simplify FIG. 5. The pump 67 circulates reactant gases and product gases such as nitrogen, oxygen and nitric oxide from 60 through absorbtion chamber 68 which contains absorbents 69 capable of absorbing chemical products formed in 60 on screen 62. Examples of absorbents 69 are activated carbon especially in the form of charcoal, and a slurry of charcoal in water. Pyrolized cellulose from field and forest waste material in which a charcoal-like matter is formed by heating vegetable matter in a container from which air is excluded forms suitable material for absorbent 69. This type of absorbent is subsequently removed from 68 and employed as a nitrogen fertilizer. Another absorbent is an aqueous solution of ferrous sulfate. Other solutions for absorbent 69 are those of disodium dioxide, of sodium chlorate, of potassium sulfite, of sodium sulfite, of sodium hydrogen phosphate etc. An absorbent which is to be used with great advantage in developing areas of the world where nitrate fertilizers are not readily available is a slurry of water and soil as well as a soil extract solution, since many of the above absorbers are to be found in soil material. The carbonization of any cellulosic forest and field waste by a pyrolysis in which air is excluded forms an absorbent carbon which can be used as a nitrogen fertilizer when it has absorbed nitric oxide by being placed in chamber 68. The duct 70 connects outlet port 64 to pump 67. Duct 71 connects inlet port 63 to vacuum control valve 73 which regulates the vacuum in 60. Pressure in 60 is within the range of from 40 millibars to one atmosphere. Gas supply valve 74 admits reactant gases to the gas stream cycling through 60 and 68 when the pressure in 68 drops below a predetermined margin. This margin for example is generally determined as one atmosphere but may be greater or less in various embodiments. In a principal embodiment the pressure in 60 is 0.17 atmospheres in a mixture of four parts oxygen and one part nitrogen. In that embodiment reactant gases admitted through 74 are one part oxygen and one part nitrogen at a total pressure of one atmosphere approximately. It is not intended to limit this embodiment of the invention to just the reactor described in FIG. 1 which is 60 of this FIG. 5. The reactor of FIG. 3 is also to be used in place of reactor 60. Then the inlet port 31 of the reactor in FIG. 3 is connected to duct 71 in place of inlet port 63. Also exit port 27 of the reactor of FIG. 3 is connected to duct 70 of this FIG. 5 in place of the connection of 64 to 70. It is not intended to limit the basic inventive concept as described in this FIG. 5 to the use of only two reactants such as nitrogen and oxygen. In accord with the invention other reactants are used as well with other catalytic material. Nitrogen and hydrogen at reduced pressure of approximately one sixth atmosphere are excited by electrode 66 and reacted on a variety of catalytic screens 62 and on various catalytic pellets supported by 62 but not shown. Examples of such screens are screens of oxidized wire of iron, of aluminum, of titanium, of nickel and of silicon. Examples of catalytic pellets, not shown, to be used while supported on 62 or on 20 of FIG. 3 in order to react nitrogen and hydrogen according to FIG. 5 are pellets of those compounds known to chemisorb active nitrogen and hydrogen such as sodium Y type zeolites, nickel Y type and cobalt Y type zeolites, manganese X type zeolites, granulated activated alumina, atomic aluminum as found in aluminum graphimets etc. Examples of elements to be used in the form of wire screen for 62 as well as in the form of granules to be supported on 62 and on 20 are tungsten, tantalum and molybdenum. When ammonia is produced by these catalysts in 60 or in 25 of FIG. 3 then the absorbent used in container 68 of this FIG. 5 is water. Finally, since aluminum nitride is known to react with steam to provide ammonia, and since active nitrogen reacts with atomic aluminum, the embodiment of the invention in this FIG. 5 is used to efficiently activate nitrogen and to react it on granulated aluminum oxide or on an aluminum graphimet in which atomic aluminum is exposed. The reaction to product ammonia is completed when water vapor is also reacted with either the aluminum oxide or the graphimet or both. Other examples of catalysts for reacting excited state nitrogen with water vapor are titania and titania-zirconia and chromic oxide and molybdenum trioxide.

I claim:

1. A gas phase chemical reaction system comprising:
    (1) gas particle excitation means capable of placing into chemically excited states gas molecules and atoms with an electric discharge in the form of a plasma from a single electrode discharge with the electrode receiving very high radio frequency current at very high impedance and having a radio frequency shield to prevent electromagnetic radiation energy loss, and
    (2) catalyst contacting and ultraviolet radiation shielding means in the form of a mass of opaque catalytic substance capable of being contacted in such a way by a gas stream containing excited gas species from said excitation means that the excited gas particles are shielded by the catalytic material when they move from the area of the electric excitation and ultraviolet radiation into and through small openings in the catalytic material, said openings being in such a direction as to interpose the catalytic material between the ultraviolet radiation and the gas stream flowing through the catalytic bed, and
    (3) first reaction product concentration means in the form of a bed of absorbtive material capable of absorbing product gases from a gas stream flowing from said catalyst contacting means,
    (4) reactant and product gas circulation means in the form of a pump capable of cycling gas through a chamber containing the single electrode excitation means and through the catalyst contacting means as well as through the first product absorbtion means and back to the excitation means.

2. A gas phase chemical reactor as in claim 1 having additionally a gas pressure control means in the form of a vacuum control valve capable of regulating lowered gas pressure in a chamber containing the gas particle excitation means.

3. A gas phase chemical reactor as in claim 1 in which the gas molecules and atoms are molecules and atoms of nitrogen and oxygen and in which the catalytic contacting and ultraviolet shielding means is multiple layers of anodized tungsten wire screen having a very fine mesh, and in which the product gas capable of being absorbed on the bed of the absorbtive material of the first product concentration means is nitric oxide and the bed of absorbtive material of the first product concentration means is activated carbon in aqueous slurry.

4. A gas phase chemical reactor as in claim 1 in which the gas molecules and atoms are molecules and atoms of nitrogen and oxygen and in which the catalytic contacting and ultraviolet shielding means is comprised of both a very fine mesh metallic screen of molybdenum wire coated with molybdenum oxide and also molybdenum oxide granules which are supported by the screen and in which the product gas capable of being absorbed on the absorbtive material of the first product concentration means is nitric oxide and the absorbtive material is carbon derived by pyrolysis of vegetable matter.

5. A gas phase chemical reactor as in claim 1 in which the gas molecules and atoms are molecules and atoms of nitrogen and oxygen and in which the catalyst contacting and ultraviolet shielding means is a matrix formed by multiple layers of anodized molybdenum wire screen and in which the product gas capable of being absorbed on the absorbtive material of the first product concentration is nitric oxide and the absorbtive material is an aqueous solution of ferrous sulfate.

6. A gas phase chemical reactor as in claim 1 in which the gas molecules and atoms are molecules and atoms of nitrogen and oxygen and in which the catalytic contacting and ultraviolet shielding means is comprised of both a very fine mesh metallic screen of tungsten wire coated with a tungsten oxide and tungstic oxide pellets which are supported by the screen, and in which the product gas capable of being absorbed on the absorbtive material of the first product concentration means is nitric oxide and the absorbtive material is charcoal type carbon derived from pyrolyzed wood and cellulosic vegetable matter in the form of field and forest waste materials.

7. A gas phase chemical reaction system as in claim 1 in which the gas molecules and atoms are of nitrogen and hydrogen and in which the catalyst contacting and ultraviolet shielding means is a bed of y type zeolite of a metal selected from the group consisting of sodium, nickel, cobalt and manganese, and in which the product gas capable of being absorbed on the absorbtive material of the first product concentration means is ammonia and the absorbtive material is water.

8. A chemical reaction system as in claim 1 in which the gas molecules and atoms are of hydrogen and nitrogen and in which the catalyst contacting and ultraviolet shielding means is a catalytic bed of manganese x type zeolites, and in which the product gas capable of being absorbed on the absorbtive material of the first product concentration means is ammonia and the absorbtive material is water.

9. A chemical reaction system as in claim 1 in which the gas molecules and atoms are of hydrogen and nitrogen and in which the catalyst contacting and ultraviolet shielding means is granulated, activated alumina and atomic aluminum type graphimet, and in which the product gas capable of being absorbed on the absorbtive material of the first product concentration means is ammonia and the absorbtive material is water.

10. A chemical reaction system as in claim 1 in which the gas molecules and atoms are of nitrogen and hydrogen and in which the catalyst contacting and ultraviolet shielding means is wire screening made from wire of a metal selected from the group consisting of tungsten, tantalum and molybdenum.

11. A chemical reactor as in claim 1 in which the gas molecules and atoms are molecules and atoms of nitrogen and water vapor and in which the catalytic contacting and ultraviolet shielding means is a catalytic bed of granulated activated alumina and aluminum graphimet, and in which the product gas capable of being absorbed on the absorbtive material of the first product concentration means is ammonia and the absorbtive material is water.

12. A gas phase chemical reaction system as in claim 1 in which the catalyst contacting means and the ultraviolet shielding means is a bed of catalytic material in the form of pellets and granules of tungsten oxide and molybdenum oxide located at the base of a reaction chamber, said being supported by a porous material and said bed being located beneath the plasma of the gas particle excitation means and said bed being capable of permeation by a gas stream moving from the plasma and through the bed.

13. A gas phase chemical reaction system as in claim 1 and having additionally a desorbtion-reaction means by which compounds absorbed on the absorbtive material of the first product absorbtion means are heated and desorbed and reacted with a reactant in a second time period, and having additionally a second product reaction means in the form of a container of absorbtive material capable of absorbing a product of the reaction of the second period.

14. A gas phase chemical reaction system as in claim 13 in which the gas molecules and atoms of the gas excitation means are molecules and atoms of oxygen and nitrogen, and in which one of the product gases of the first product concentration means is nitrogen oxide and in which the absorbtive material capable of absorbing product gas of the first reaction product concentration means is an absorbtive material selected from the group consisting of chromium trioxide supported on activated alumina and on silica gel, cupric oxide on alumina, manganese oxide, magnesium oxide, nickel oxide, molybdenum trioxide, platinum supported on alumina and on silica, rhenium and rhodium supported on alumina and on silica and CoNiNa y type crystaline zeolite.

15. A reaction system as in claim 13 in which the reactant of the desorbtion-reaction means is hydrogen gas, and the product of the second reaction period is ammonia and the absorbent of the second product reaction period is water.

16. A reaction system as in claim 13 in which the desorbtion-reaction means by which compounds absorbed on the absorbtive material of the first product absorbtion means are heated and desorbed is an electric resistance heater heating a duct which carries the reactant gas of the second time period and heats the absorbed compounds by means of contact with the heated gas when the heated gas flows during the second time period.

17. A reaction system as in claim 13 in which the desorbtion-reaction means by which compounds absorbed on the absorbtive material of the first product absorbtion means are heated and desorbed is an electric resistance heater embedded in the same absorbtive material of the first product absorbtion means, said heater being energized by current only during the second period which is the period of the desorbtion reaction.

18. A chemical reaction system as in claim 1 in which the catalyst contacting means and the ultraviolet shielding means is chromium trioxide and manganese oxide and in which the product gas capable of being absorbed on the bed of absorbative material of the first product concentration means is nitric oxide and the reactant gas molecules and atoms are of nitrogen and oxygen.

* * * * *